United States Patent
Fujiwara et al.

(10) Patent No.: US 11,496,336 B2
(45) Date of Patent: Nov. 8, 2022

(54) METHOD OF A COMMUNICATION SYSTEM HAVING A CONTROL DEVICE AND A RELAY DEVICE

(71) Applicant: Murata Machinery, Ltd., Kyoto (JP)

(72) Inventors: Toshihiro Fujiwara, Ise (JP); Shigeru Yamamoto, Ise (JP); Tetsuya Kuwahara, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 20 days.

(21) Appl. No.: 16/954,093

(22) PCT Filed: Dec. 14, 2018

(86) PCT No.: PCT/JP2018/046187
§ 371 (c)(1),
(2) Date: Jun. 15, 2020

(87) PCT Pub. No.: WO2019/124275
PCT Pub. Date: Jun. 27, 2019

(65) Prior Publication Data
US 2021/0184892 A1   Jun. 17, 2021

(30) Foreign Application Priority Data
Dec. 21, 2017   (JP) .............................. JP2017-244994

(51) Int. Cl.
*H04L 12/46*   (2006.01)
*H04L 69/14*   (2022.01)

(52) U.S. Cl.
CPC .......... *H04L 12/4604* (2013.01); *H04L 69/14* (2013.01)

(58) Field of Classification Search
CPC ....... B23P 19/066; B25B 23/14; G05B 15/02; G05B 19/042; G06F 13/00; H04L 12/28;
(Continued)

(56) References Cited

U.S. PATENT DOCUMENTS

| | | | |
|---|---|---|---|
| 5,379,298 A | 1/1995 | Saiki et al. | |
| 5,749,058 A * | 5/1998 | Hashimoto | ............ B25J 9/1674 700/83 |

(Continued)

FOREIGN PATENT DOCUMENTS

| | | |
|---|---|---|
| JP | 2-15749 A | 1/1990 |
| JP | 5-276213 A | 10/1993 |

(Continued)

OTHER PUBLICATIONS

Notice of Reasons for Refusal dated Dec. 8, 2020, of counterpart Japanese Application No. 2019-561057, along with an English translation.

*Primary Examiner* — Douglas B Blair
(74) *Attorney, Agent, or Firm* — DLA Piper LLP (US)

(57) ABSTRACT

A method includes: (a) transmitting, by the control device, control data containing one of the plurality of second parameters to the relay device; (b) determining, by at least one of the control device or the relay device, whether the one of the plurality of second parameters matches one of the plurality of first parameters; and (c) transmitting, by the relay device, the control data received from the control device in (a), using one of the plurality of interfaces of the relay device for which the one of the plurality of second parameters is set if it is determined in the determining that the one of the plurality of first parameters matches the one of the plurality of second parameters.

11 Claims, 5 Drawing Sheets

(58) Field of Classification Search
CPC ..... H04L 12/66; H04L 12/282; H04L 12/413; H04L 12/2827; H04L 12/2832; H04L 12/4604; H04L 29/04; H04L 29/06; H04L 29/06027; H04L 45/00; H04L 47/10; H04L 67/00; H04L 67/02; H04L 67/125; H04L 67/327; H04L 2012/2849; H05B 37/0227
USPC .......................................... 370/401; 700/275
See application file for complete search history.

(56) References Cited

U.S. PATENT DOCUMENTS

| | | | | |
|---|---|---|---|---|
| 5,778,189 | A * | 7/1998 | Kimura | G06F 13/387 709/236 |
| 5,952,934 | A * | 9/1999 | Matsumoto | H04L 61/5038 340/9.16 |
| 6,070,196 | A * | 5/2000 | Mullen, Jr. | H04L 9/40 709/214 |
| 8,219,214 | B1 * | 7/2012 | Mimlitz | G05B 15/02 700/20 |
| 10,028,405 | B1 * | 7/2018 | Gandhi | H05K 7/1494 |
| 10,469,550 | B2 * | 11/2019 | Gyobu | H04M 3/567 |
| 10,599,604 | B2 * | 3/2020 | Reidt | G06F 13/4081 |
| 2002/0022260 | A1 * | 2/2002 | Ishii | G05B 19/41875 435/286.1 |
| 2003/0137985 | A1 * | 7/2003 | Koyanagi | H04L 12/6418 370/466 |
| 2005/0122957 | A1 * | 6/2005 | Ambe | H04L 12/4641 370/351 |
| 2005/0210084 | A1 * | 9/2005 | Goldick | G06F 16/10 |
| 2011/0246720 | A1 * | 10/2011 | Nakamura | G06F 12/0813 711/119 |
| 2011/0282507 | A1 * | 11/2011 | Oudalov | H04B 3/54 700/292 |
| 2013/0336202 | A1 * | 12/2013 | Oh | H04B 7/155 370/315 |
| 2014/0369179 | A1 * | 12/2014 | Ueda | H04L 67/12 370/392 |
| 2015/0076903 | A1 * | 3/2015 | Kanayama | H02M 7/493 307/31 |
| 2015/0378450 | A1 * | 12/2015 | Petkov | G06F 3/04883 345/442 |
| 2015/0381414 | A1 * | 12/2015 | Xu | H04L 67/12 709/222 |
| 2016/0105326 | A1 * | 4/2016 | Smart | H04L 41/0873 370/242 |
| 2016/0149716 | A1 * | 5/2016 | Raj | H04L 12/2832 700/275 |
| 2016/0373562 | A1 * | 12/2016 | Chen | H04L 69/28 |
| 2018/0011466 | A1 * | 1/2018 | Murayama | G05B 19/05 |

FOREIGN PATENT DOCUMENTS

| | | |
|---|---|---|
| JP | 2001-308948 A | 11/2001 |
| JP | 2010-146437 A | 7/2010 |
| JP | 2012-23511 A | 2/2012 |

* cited by examiner

FIG. 2
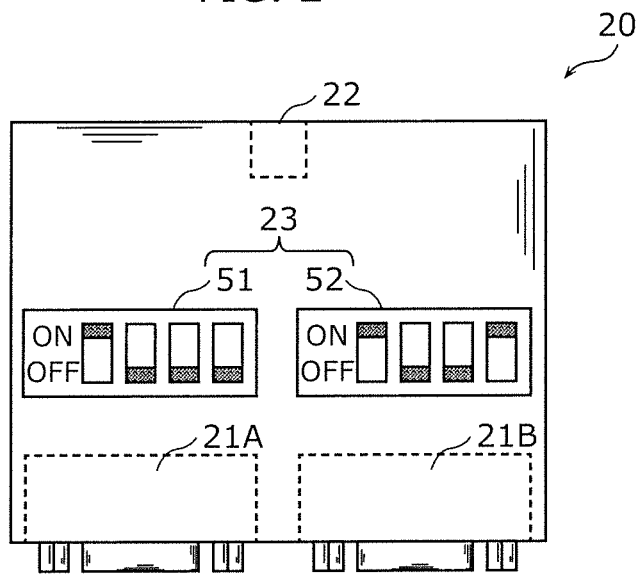
FIG. 3
| Baud Rate [baud] | 115200 |
|---|---|
| Number of Bits per Character | 8 |
| Number of Stop Bits | 1 |
| Parity Check | None |
| Flow Control | None |
FIG. 4
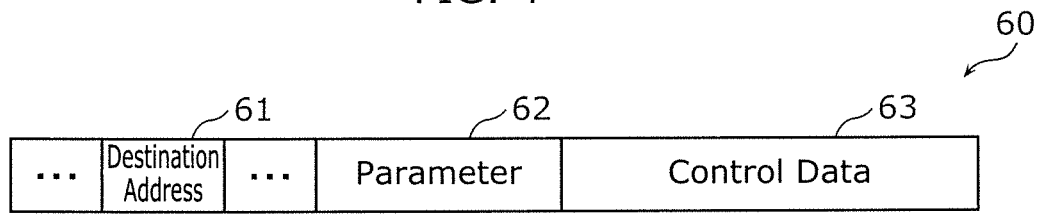

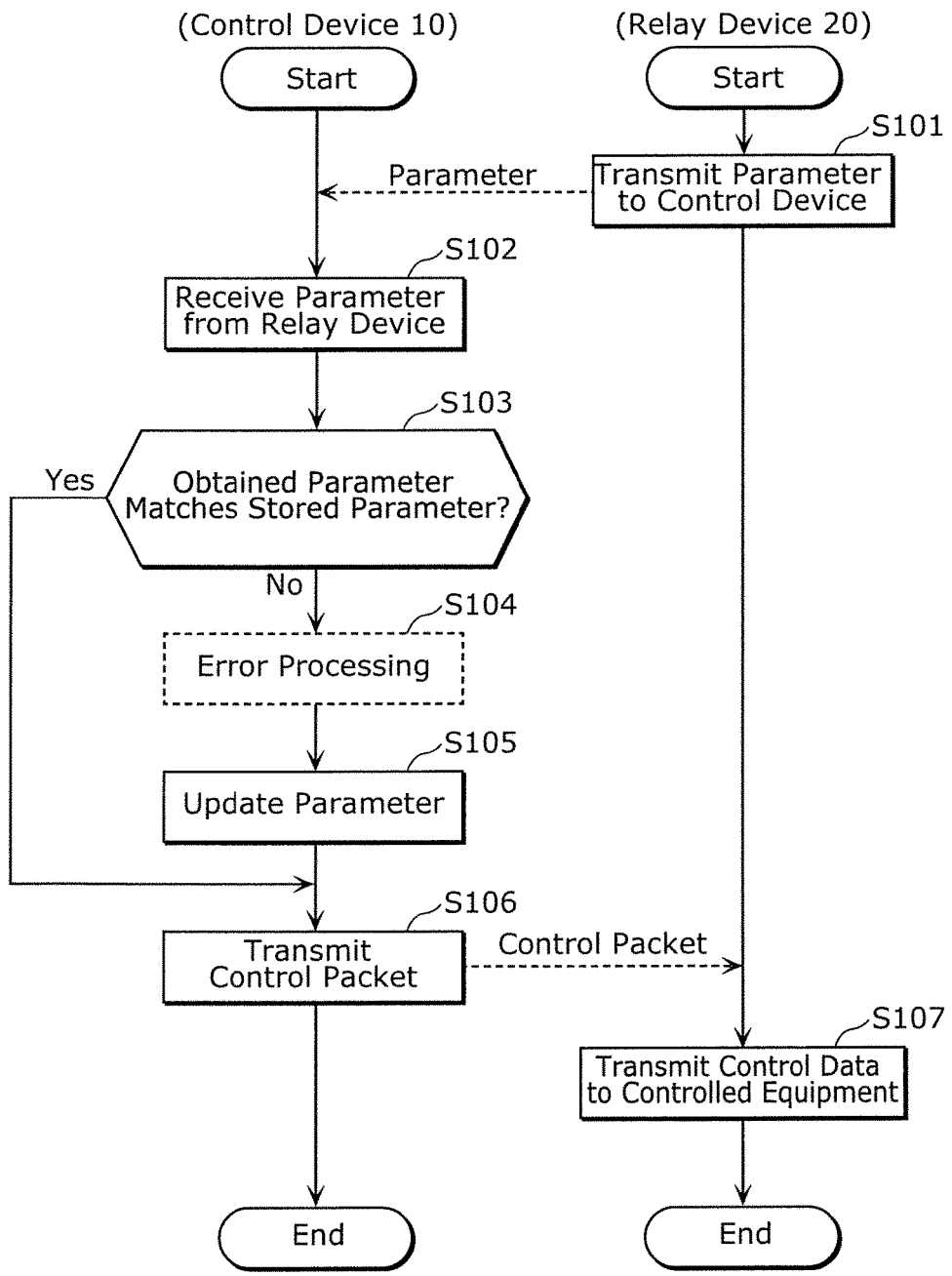
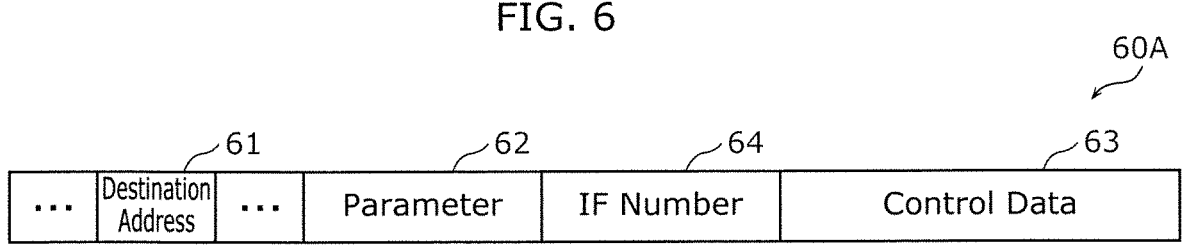

METHOD OF A COMMUNICATION SYSTEM HAVING A CONTROL DEVICE AND A RELAY DEVICE

TECHNICAL FIELD

This disclosure relates to a method of controlling a communication system, the communication system, and a relay device.

BACKGROUND

Local area network (LAN) using ETHERNET (registered trademark), for example, is utilized in facilities such as factories.

On the other hand, a plurality of controlled equipment that transfer articles or perform various types of processing of articles are utilized. The plurality of controlled equipment receive control instructions from a control device through communications and operate in accordance with the received control instructions. Serial communications using legacy device interfaces (e.g., RS-232C), for example, are utilized between the control device and the controlled equipment.

Japanese Unexamined Patent Application Publication No. 2012-23511 discloses eliminating processing delays for commands to be processed immediately, in a relay device that relays communications between interfaces for LAN communications and interfaces for serial communications.

If connected to a plurality of controlled equipment through a plurality of serial communication interfaces, a relay device transmits and relays control instructions from a control device to a proper one of the controlled equipment. At that time, the control instructions transmitted by the control device contain parameters of serial communications. Based on the parameters, the relay device selects the proper one of controlled equipment to which the control instructions are to be transmitted, and transmits the control instructions to the selected controlled equipment.

However, if communication parameters (referred to as "parameters") used for serial communications with the controlled equipment are managed by the relay device and the control device independently, it is determined that the parameters do not match between the relay device and the control device. There is the problem of failing to transmit control instructions to a proper one of the controlled equipment or causing a malfunction of the controlled equipment.

There is a need to set the parameters managed by the relay device (e.g., set by a manager) individually in accordance with the locations of the controlled equipment or purposes. With respect to the parameters managed by the relay device, there is thus also a need to change the parameters managed by the relay device or the control device every time when the parameters do not match between the relay device and the control device.

There is thus a need to reduce problems in controlling controlled equipment through the relay between network communications and serial communications.

SUMMARY

We thus provide a method of controlling a communication system including a control device and a relay device that are connected via a network to control a plurality of controlled equipment. The relay device includes: a plurality of interfaces communicably connected to the plurality of controlled equipment in one to one correspondence; and a first storage that stores a plurality of first parameters, the plurality of first parameters being used for communication by the plurality of interfaces in one to one correspondence. The control device includes: a second storage that stores a plurality of second parameters, the plurality of second parameters being defined for use for communication by the plurality of interfaces in one to one correspondence. The method includes: (a) transmitting, by the control device, control data containing one of the plurality of second parameters to the relay device; (b) determining, by at least one of the control device or the relay device, whether the one of the plurality of second parameters matches one of the plurality of first parameters; and (c) transmitting, by the relay device, the control data received from the control device in (a), using one of the plurality of interfaces of the relay device for which the one of the plurality of second parameters is set if it is determined in the determining that the one of the plurality of first parameters matches the one of the plurality of second parameters.

The method allows transmission of the control data from the relay device to the controlled equipment if the respective parameters stored in the control device and the relay device match each other. In other words, if the parameters do not match between the relay device and the control device, the method reduces the transmission of the control data from the relay device to the controlled equipment. This reduces the problems that the relay device fails to transmit a control instruction to a proper one of the controlled equipment or causes a malfunction of the controlled equipment. In this manner, the communication system reduces the problems in controlling the controlled equipment through the relay between network communications and serial communications.

The first storage may include a hardware switch whose state defines the one of the plurality of first parameters, the state being changeable by an operation by a user. In (b), the determining may be performed using the one of the plurality of first parameters defined by the state of the hardware switch.

The hardware switch thus included in the relay device stores the parameters. Being intuitively and easily operatable by a user, the hardware switch cannot be changed by information processing in principle. The hardware switch thus changes the parameters based on the operation by the user. If the parameters stored in the control device and the relay device do not match each other, for example, the parameters stored in the control device are adjusted to the parameters defined by the hardware switch. This hinders transmission of the control data from the relay device to the controlled equipment, while the parameters do not match each other.

In (b), the control device may obtain the one of the plurality of first parameters from the relay device, and perform the determining using the one of the plurality of first parameters obtained. In (a), the control device may transmit the control data if it is determined in the determining in (b) that the one of the plurality of first parameters matches the one of the plurality of second parameters. In (c), the relay device may receive the control data transmitted in (a), and transmit the control data received.

The control device thus determines whether the respective parameters stored in the control device and the relay device match each other. Based on such a specific configuration, the communication system reduces the problems in controlling the controlled equipment through the relay between network communications and serial communications.

The control method may further include: (d) storing, as a new second parameter in the second storage by the control device, the one of the plurality of first parameters obtained from the relay device in (b) if it is determined in the determining that the one of the plurality of first parameters does not match the one of the plurality of second parameters. In (a), the control device may transmit the control data containing the new second parameter to the relay device. In (c), the relay device may transmit the control data containing the new second parameter received from the control device in (a) by one of the plurality of interfaces of the relay device for which the one of the plurality of first parameters is set.

If the respective parameters stored in the control device and the relay device do not match each other, the control device thus obtains the parameters from the relay device and stores the obtained parameters. This allows elimination of the mismatch between the parameters and transmission of the control data to the controlled equipment after the elimination.

In (d), a presenter included in the control device may present an error to a user if it is determined in the determining that the one of the plurality of first parameters does not match the one of the plurality of second parameters.

If the respective parameters stored in the control device and the relay device do not match each other, the control device thus notifies the user of the mismatch. This allows presentation of the mismatch between the parameters to the user, and encourages the user to take an appropriate action.

In (b), the relay device may perform the determining using the one of the plurality of second parameters contained in the control data transmitted in (a). In (c), the relay device may transmit the control data received from the control device in (a) if it is determined in the determining in (b) that the one of the plurality of first parameters matches the one of the plurality of second parameters.

The relay device thus determines whether the respective parameters stored in the control device and the relay device match each other. Based on such a specific configuration, the communication system reduces the problems in controlling the controlled equipment through the relay between network communications and serial communications.

The method further may include: (d) receiving at least one of the plurality of first parameters from the relay device and storing the at least one of the plurality of first parameters as a new second parameter in the second storage by the control device if it is determined in the determining that the one of the plurality of first parameters does not match the one of the plurality of second parameters; (e) transmitting, by the control device, new control data containing the new second parameter to the relay device; and (f) transmitting, by the relay device, the new control data received from the control device in (e), using one of the plurality of interfaces of the relay device for which the one of the plurality of first parameters is set.

If the respective parameters stored in the control device and the relay device do not match each other, the control device thus obtains the parameters from the relay device and stores the obtained parameters. This allows elimination of the mismatch between the parameters and transmission of the control data to the controlled equipment after the elimination.

In (g), a presenter included in at least one of the control device or the relay device may present an error to a user if it is determined in the determining that the one of the plurality of first parameters does not match the one of the plurality of second parameters.

If the respective parameters stored in the control device and the relay device do not match each other, the control device thus notifies the user of the mismatch. This allows presentation of the mismatch between the parameters to the user, and encourages the user to take an appropriate action.

The control device and the relay device may be connected via a network under Ethernet for Control Automation Technology (ETHERCAT, registered trademark). Each of the plurality of interfaces and an associated one of the plurality of controlled equipment may be connected via a serial communication cable.

This configuration reduces problems in controlling the controlled equipment in the communication system that performs the relay between serial communications and communications via a network under the ETHERCAT standard, which is one of the standards for industrial networks.

Our communication system may include: a control device and relay device connected via a network to control plurality of controlled equipment. The relay device may include: a plurality of interfaces, each communicably connected to one of the plurality of controlled equipment in one to one correspondence; and a first storage that stores a plurality of first parameters, the plurality of first parameters being used for communication by the plurality of interfaces in one to one correspondence. The control device may include: a second storage that stores a plurality of second parameters, the plurality of second parameters being defined for use for communication by the plurality of interfaces in one to one correspondence; and a transmitter that transmits control data containing one of the plurality of second parameters to the relay device. One of the relay device and the control device may further include a determiner that determines whether the one of the plurality of second parameters matches one of the plurality of first parameters. The relay device may further include a relay that transmits the control data received from the transmitter by one of the plurality of interfaces of the relay device for which the one of the plurality of second parameters is set if it is determined in the determining that the one of the plurality of first parameters matches the one of the plurality of second parameters.

The communication system provides at least the same advantages as the control method described above.

A relay device may be connected to a control device via a network to control plurality of controlled equipment. The relay device may include: a plurality of interfaces, each communicably connected to one of the plurality of controlled equipment in one to one correspondence; and a first storage that stores a plurality of first parameters, the plurality of first parameters being used for communication by the plurality of interfaces in one to one correspondence. The control device may include: a second storage that stores a plurality of second parameters, the plurality of second parameters being defined for use for communication by the plurality of interfaces in one to one correspondence; and a transmitter that transmits control data containing one of the plurality of second parameters to the relay device. The relay device may further comprise a determiner that determines whether the one of the plurality of second parameters matches one of the plurality of first parameters. The relay device may further include a relay that transmits the control data received from the transmitter by one of the plurality of interfaces of the relay device for which the one of the plurality of second parameters is set if it is determined in the determining that the one of the plurality of first parameters matches the one of the plurality of second parameters.

The relay device provides at least the same advantages as the control method described above.

We also provide not only the control method, but programs causing a computer to execute the processing, as a computer readable storage medium such as a CD-ROM, storing the programs, or as information, data, or signals indicating the programs. These programs, information, data, and signals may be distributed via a communication network such as the internet.

We thus provide a method of controlling the communication system that reduces problems in controlling the controlled equipment through the relay between network communications and serial communications.

BRIEF DESCRIPTION OF THE DRAWINGS

FIG. 2 is a schematic diagram showing a representative appearance of a relay device according to Example 1.

FIG. 3 illustrates a representative parameter set stored in a storage according to Example 1.

FIG. 4 illustrates a first example field of control data according to Example 1.

FIG. 5 shows a flow of processing performed by a control device according to Example 1.

FIG. 6 illustrates a second example field of a control packet according to Example 1.

Figure 1:
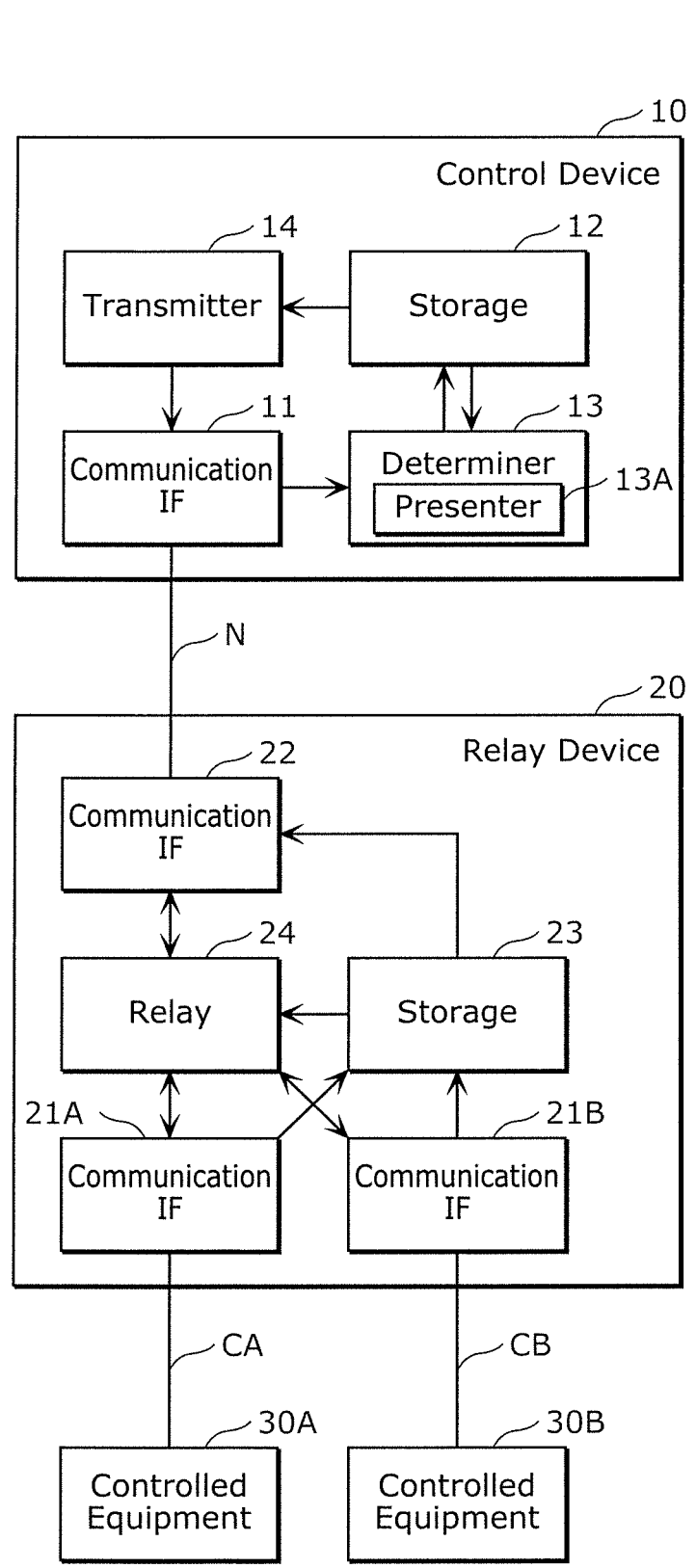
FIG. 1 is a block diagram showing a configuration of a communication system according to Example 1.

REFERENCE SIGNS LIST 1, 2 communication system
10, 10A control device
11, 21A, 21B, 22 communication IF
12, 12A, 23 storage
13, 25 determiner
13A, 25A presenter
14 transmitter
20, 20A relay device
24 relay
30A, 30B controlled instrument
51, 52 DIP switch
60, 60A control packet
61 destination address
62 parameter
63 control data
64 IF number
CA, CB serial communication cable
N network

DETAILED DESCRIPTION

Examples of our methods, systems and devices will now be described in detail with reference to the drawings.

The examples described below are mere preferred examples. The numerical values, shapes, materials, constituent elements, the arrangement and connection of the constituent elements, steps, step orders and the like shown are thus mere examples, and are not intended to limit the scope of this disclosure. Among the constituent elements in the following examples, those not recited in any of the independent claims defining the broadest concepts of this disclosure are described as optional constituent elements constituting more preferred configurations.

The same reference characters are used to represent equivalent elements, and the detailed explanation thereof may be omitted.

Example 1

Described in this example is a communication system, for example, that reduces problems in controlling controlled equipment through the relay between network communications and serial communications.

FIG. 1 is a block diagram showing a configuration of communication system 1 according to this example.

As shown in FIG. 1, communication system 1 includes control device 10 and relay device 20. In addition, communication system 1 is connected to controlled equipment 30A and 30B.

Communication system 1 may be utilized as a control system that controls controlled equipment 30A and 30B that are industrial equipment placed in a factory, for example.

Control device 10 is a computer that controls controlled equipment 30A and 30B. Control device 10 is connected to relay device 20 through network N, and connected to controlled equipment 30A and 30B via relay device 20. Control device 10 transmits, to network N, communication packets (also referred to as "control packets") containing control instructions for operating each of controlled equipment 30A and 30B. For example, control device 10 may be hardware such as a personal computer (PC), but is not limited thereto.

Relay device 20 is connected to control device 10 via network N. Relay device 20 is also connected to controlled equipment 30A and 30B via serial communication cables CA and CB, respectively. Relay device 20 performs the relay between communications via network N and serial communications on serial communication cables CA and CB. For example, upon receipt of the control packets from control device 10 via network N, relay device 20 converts the received control packets into control data in a serial communication format. Then, the relay device transmits the control data through serial communication cable CA or CB to controlled equipment 30A or 30B. Accordingly, relay device 20 performs the relay between communications via network N and serial communications. For example, relay device 20 may be hardware such as a small PC, but not limited thereto.

Controlled equipment 30A operates under control of control device 10. Controlled equipment 30A is connected to relay device 20 via serial communication cable CA. Controlled equipment 30A receives the control data transmitted by control device 10 and relayed by relay device 20, and operates in accordance with control instructions contained in the received control data. Specifically, controlled equipment 30A is a processor (e.g., a processor for various physical or chemical processing of semiconductor wafers) used inside a factory and including a serial interface.

Like controlled equipment 30A, controlled equipment 30B operates under control of control device 10. Controlled equipment 30B is connected to relay device 20 through serial communication cable CB, receives control instructions independently from controlled equipment 30A, and operates independently.

Configurations of control device 10 and relay device 20 will now be described in detail.

As shown in FIG. 1, control device 10 includes communication IF 11, storage 12, determiner 13, and transmitter 14.

Communication IF 11 is a communication interface connected to network N. Communication IF 11 is communicably connected to communication IF 22 of relay device 20 via network N. For example, network N is a wired local area network (LAN) under an industrial network standard such as IEEE 802.3, ETHERNET, or ETHERCAT or a wireless LAN under a standard such as IEEE 802.11a, b, g, or n, but is not limited thereto.

Storage 12 of control device 10 stores two sets of parameters used for communications on communication IFs 21A and 21B of relay device 20. The two sets of parameters stored in storage 12 are defined for use for communications on communication IFs 21A and 21B of relay device 20. The two sets of parameters stored in storage 12 were set to be used for communications on communication IFs 21A and 21B in the time point of past and do not necessarily match the two parameter sets for communication IFs 21A and 21B at present. The two sets of parameters stored in storage 12 may be updated into new parameters provided by determiner 13. Storage 12 of control device 10 operated by a processor executing programs using a memory, for example. The two respective sets of parameters stored in storage 12 are also referred to as "second parameters".

Determiner 13 is a processor that determines whether the two sets of parameters stored in storage 12 of control device 10 match the two sets of parameters stored in storage 23 of relay device 20. This determination is also referred to as "matching determination". Storage 12 operated by a processor executing programs using a memory, for example.

Determiner 13 obtains the two sets of parameters stored in storage 23 of relay device 20 before the matching determination. Then, determiner 13 performs the matching determination using the obtained two sets of parameters. There are various types of methods for determiner 13 to obtain the two sets of parameters stored in storage 23. For example, determiner 13 transmits a request for the obtention in advance, and receives and obtains the two sets of parameters transmitted from relay device 20 in accordance with this request. If relay device 20 regularly transmits the two sets of parameters regardless of any request, determiner 13 may simply receive and obtain the transmitted two sets of parameters.

Determiner 13 includes presenter 13A that presents information to a user. Presenter 13A is, for example, a display screen, an LED indicator, or a speaker. Presenter 13A presents an error to the user if it is determined in the matching determination that the two sets of parameters stored in storage 12 of control device 10 do not match the two sets of parameters stored in storage 23 of relay device 20. For example, presenter 13A displays an image indicating the occurrence of an error on the display screen, indicates the occurrence of an error with light emitted from the LED indicator, or outputs a sound notifying the occurrence of an error from the speaker.

Transmitter 14 is a processor that generates and transmits control packets containing control instructions that control controlled equipment 30A and 30B. Transmitter 14 determines specific operations to be executed by controlled equipment 30A and 30B based on a predetermined plan to control controlled equipment 30A and 30B. Then, transmitter 14 generates control instructions that cause the equipment to execute the determined operations or generates the control packets containing the control instructions. Then, transmitter 14 transmits the generated control packets to relay device 20. Transmitter 14 operated by a processor executing programs using a memory, for example.

The control packets generated by transmitter 14 contain one of the two sets of parameters used for communications on communication IFs 21A and 21B of relay device 20. Transmitter 14 generates and transmits the control packets if determiner 13 has determined that the two sets of parameters stored in storage 12 match the two sets of parameters stored in storage 23. The one set of parameters contained in the control packets is used for serial communications between relay device 20 and the controlled equipment to be controlled based on the control packets. For example, transmitter 14 causes the control packets to contain the parameters stored in storage 12 and set for communication IF 21A of relay device 20 in controlling the operation of controlled equipment 30A.

Relay device 20 will now be described.

As shown in FIG. 1, relay device 20 includes communication IFs 21A, 21B, and 22, storage 23, and relay 24.

Communication IF 21A is a communication interface for serial communications and connected to controlled equipment 30A through serial communication cable CA. The serial communications are established under a standard such as RS-232C, RS-422, or RS-485.

Like communication IF 21A, communication IF 21B is a communication interface for serial communications and connected to controlled equipment 30B through serial communication cable CB. The serial communications are established under a standard such as RS-232C, RS-422, or RS-485, which is not necessarily the same as the serial communications through serial communication cable CA.

Communication IF 22 is a communication interface communicably connected to network N. Communication IF 22 is communicably connected to communication IF 11 of control device 10 via network N.

Storage 23 of relay device 20 stores two sets of parameters used for communications of communication IFs 21A and 21B. The two sets of parameters stored in storage 23 are set for communication IFs 21A and 21B at present. Storage 23 operated by a processor executing programs using a memory, for example. A hardware switch such as a DIP switch, operatable by the user or a storage device such as a memory may be used to store the parameters. The parameters stored in storage 23 are also referred to as "first parameters". The hardware switch is generally called a "physical switch" and simply referred to a "switch".

If storage 23 is a storage device such as a memory, for example, the parameters stored in storage 23 may be managed by a setting file set by a Web interface, for example. A Web interface presents setting items to the user via a Web interface and the HTTP protocol and receives the settings from the user. Storage 23 being a hardware switch will be described later in more detail.

Relay 24 is a processor that performs the relay between communications (network communications) on network N and serial communications on serial communication cable CA or CB. Upon receipt of control packets in a network communication format from communication IF 22, relay 24 transmits and relays the control data contained in the received control packets through serial communications using the parameters contained in the received control packets.

Relay 24 performs transmission through the serial communications via one or both of communication IFs 21A and 21B. The one(s) of communication IFs 21A and 21B to perform transmission through the serial communications is/are determined based on the parameters contained in the received control packets. More specifically, relay 24 transmits the control data contained in the received control packets through one(s) of communication IFs 21A and 21B for which the parameters contained in the received control packets are set.

That is, transmitter 14 transmits the control packets if the two sets of parameters stored in storage 12 match the two sets of parameters stored in storage 23. Therefore, relay 24 receives the control instructions and transmits the received instructions to the controlled equipment when the two sets of parameters stored in storage 12 match the two sets of parameters stored in storage 23. In communication system 1 shown in FIG. 1, relay device 20 communicates with two pieces of controlled equipment and thus storage 23 has the two sets of parameters. The number of sets of parameters stored in storage 23 may change as appropriate corresponding to the number of controlled equipment, that is, communication targets. Accordingly, the number of sets of parameters for the matching determination between relay device 20 and control device 10 may change.

Storage 23 will now be described in more detail.

FIG. 2 is a schematic diagram showing an appearance of relay device 20 according to this example. FIG. 3 shows an example parameter set stored in storage 23 according to this example. In this example, "one set of parameters" and "one parameter set", and "sets of parameters" and "parameter sets" are used in the same sense.

FIG. 2 shows an example configuration of storage 23. In the example, storage 23 is the DIP switch as an example hardware switch operatable by the user.

Storage 23 shown in FIG. 2 includes DIP switch 51 defining parameters of communication IF 21A, and DIP switch 52 defining parameters of communication IF 21B.

Each of DIP switches 51 and 52 includes, for example, four slide switches. Based on the states, more specifically, the on or off patterns (also referred to as "on/off patterns") of these slide switches, the parameters (i.e., the communication standard or serial setting of serial communications) may be set. For example, the on/off patterns of two of the four slide switches included in DIP switches 51 and 52 define the types of the communication standard (e.g., RS-232C, RS-422, or RS-485). The on/off patterns of the other two of the four slide switches represent serial settings. The serial settings include, for example, the baud rate (e.g., 115200 baud or 9600 baud), the number of bits (e.g., 8 or 7) per character, the number of stop bits (e.g., 1 or 2), types of parity check (e.g., none, odd parity, or even parity), flow control (e.g., none, XON/XOFF, or RTS/CTS), or the resistance (e.g., 0Ω or 120Ω) of the terminator under RS-485.

In this example, storage 23 reads the on/off patterns of DIP switches 51 and 52, and provides the read patterns via communication IF 22 to determiner 13. Determiner 13 obtains the parameters stored in storage 23 from the on/off patterns provided by storage 23, and performs the matching determination using the obtained parameters.

With the use of the other two switches of the DIP switches, storage 23 may determine which of the parameter sets stored in advance is to be employed. The one of the parameter sets is here a set of parameters set for communication IF 21A or 21B.

FIG. 3 shows one parameter set. For example, the parameter set shown in FIG. 3 indicates that the baud rate is 115200 baud and that the number of bits per character is eight.

The parameter sets may be stored in storage 23 in advance or may be edited by the user using a Web interface, for example.

A control packet transmitted by control device 10 will now be described in detail.

FIG. 4 illustrates a first example field of control packet 60 according to this example.

As shown in FIG. 4, control packet 60 has field of destination address 61, parameters 62, and control data 63.

Destination address 61 indicates the destination of control packet 60 and includes the address of relay device 20. The address is, for example, the internet protocol (IP) address or the media access control (MAC) address of relay device 20, but is not limited thereto.

Parameters 62 are for serial communications of one of controlled equipment 30A and 30B to be controlled.

Control data 63 indicates the details of the operation of the controlled equipment controlled in accordance with this control packet 60. For example, the data indicates various types of physical or chemical processing of semiconductor wafers performed by the controlled equipment.

An operation of communication system 1 configured as mentioned above will be described.

FIG. 5 shows a flow of processing performed by communication system 1 according to this example.

In step S101, storage 23 of relay device 20 transmits the two sets of parameters via communication IF 22 to control device 10. The transmitted two sets of parameters are stored in storage 23 and set for communication IFs 21A and 21B at present.

In step S102, determiner 13 of control device 10 receives the two sets of parameters transmitted by relay device 20 in step S101.

In step S103, determiner 13 determines whether the two sets of parameters received in step S102 match the two sets of parameters stored in storage 12. If the determiner determines that the two sets of parameters match each other (Yes in step S103), the process proceeds to step S106. If not (No in step S103), the process proceeds to step S104.

In step S104, determiner 13 performs error processing. In the error processing, for example, presenter 13A displays an image indicating the occurrence of an error on the display screen, indicates the occurrence of an error with light emitted from the LED indicator, or outputs a sound notifying the occurrence of an error from the speaker, to present the error to the user. This presentation of the error by presenter 13A encourages the user to take an appropriate action. Step S104 may be omitted.

In step S105, storage 12 newly stores the two sets of parameters received by determiner 13 in step S102 to update the stored two sets of parameters. This causes storage 12 to store the two sets of parameters set for communication IFs 21A and 21B at the time of executing step S101.

In step S106, transmitter 14 of control device 10 generates control packets and transmits the generated packets to relay device 20. The generated control packets contain one of the sets of parameters newly stored in storage 12 in step S105.

In step S107, relay device 20 receives the control packets transmitted in step S106. Relay 24 obtains the respective parameters set for communication IFs 21A and 21B from storage 23. The relay transmits then, to the controlled equipment, the control data contained in the control packets from one of communication IFs 21A and 21B for which the parameters that match the parameters contained in the received control packets are set.

In the series of processing, assume that the two sets of parameters stored in storage 12 match the two sets of parameters stored in storage 23. In this example, the two sets of parameters stored in storage 12 are not updated and the control data is transmitted through the relay by relay device 20 to controlled equipment 30A or 30B.

On the other hand, assume that the two sets of parameters stored in storage 12 at least partially differ from the two sets of parameters stored in storage 23. In this example, the two sets of parameters stored in storage 12 are updated and new control packets containing the updated parameters are transmitted. The control data containing the updated parameters is transmitted through the relay by relay device 20 to controlled equipment 30A or 30B. If only ones of the two sets of parameters stored in storage 12 and storage 23 differ from each other, storage 12 may update only the different parameter.

Control device 10 may determine to which of the controlled equipment connected to communication IFs 21A and 21B of relay device 20 the control data contained in the control packets is to be transmitted. In this example, control packet 60A shown in FIG. 6 is used in place of control packet 60 described above.

As shown in FIG. 6, control packet 60A contains the field of IF number 64 in addition to the fields contained in control packet 60.

IF number 64 indicates one of communication IFs 21A and 21B to which control packet 60A is to be transmitted.

In this example, determiner 13 determines in the determination in step S103 whether the parameters match with respect to one of communication IFs 21A and 21B indicated by IF number 64 contained in control packet 60A. The other processing in FIG. 5 is as described above.

Assume that control device 10 determines to which of the controlled equipment connected to communication IFs 21A and 21B of relay device 20 the control data contained in the control packets is to be transmitted. The configuration described above reduces the problems that the relay device fails to transmit the control data to a proper one of the controlled equipment or causes malfunction of the controlled equipment.

As described above, the communication system according to this example transmits the control data from the relay device to the controlled equipment if the two respective sets of parameters stored in the control device and the relay device match each other. In other words, if at least ones of the two sets of parameters do not match between the relay device and the control device, the system reduces the transmission of the control data from the relay device to the controlled equipment. This reduces the problems that the relay device fails to transmit control instructions to a proper one of the controlled equipment or causes a malfunction of the controlled equipment. In this manner, the communication system reduces the problems in controlling the controlled equipment through the relay between network communications and serial communications.

The hardware switches included in the relay device store the two sets of parameters. The hardware switches are intuitively and easily operated by the user but cannot be changed by information processing in principle. The hardware switches thus change the parameters based on the operation by the user. If the parameters stored in the control device and the relay device do not match each other, the parameters stored in the control device are adjusted to the parameters defined by the hardware switches. This hinders transmission of the control data from the relay device to the controlled equipment, while the parameters do not match each other.

The control device determines whether the two respective sets of parameters stored in the control device and the relay device match each other. Based on such a specific configuration, the communication system reduces problems in controlling the controlled equipment through the relay between network communications and serial communications.

If at least ones of the two respective sets of parameters stored in the control device and the relay device do not match each other, the control device obtains the two sets of parameters from the relay device and stores the obtained parameters. This allows elimination of the mismatch between the parameters and transmission of the control data to the controlled equipment after the elimination.

If at least ones of the two respective sets of parameters stored in the control device and the relay device do not match each other, the control device notifies the user of the mismatch. This allows presentation of the mismatch between the parameters to the user, and encourages the user to take an appropriate action.

The problems in controlling the controlled equipment decreases in the communication system that performs the relay between serial communications and communications via the network under the ETHERCAT standard.

Example 2

Described in this example is a communication system, for example, that reduces problems in controlling controlled equipment through the relay between network communications and serial communications. In this example, not the control device but the relay device performs the matching determination between the parameters unlike in Example 1.

Figure 7:
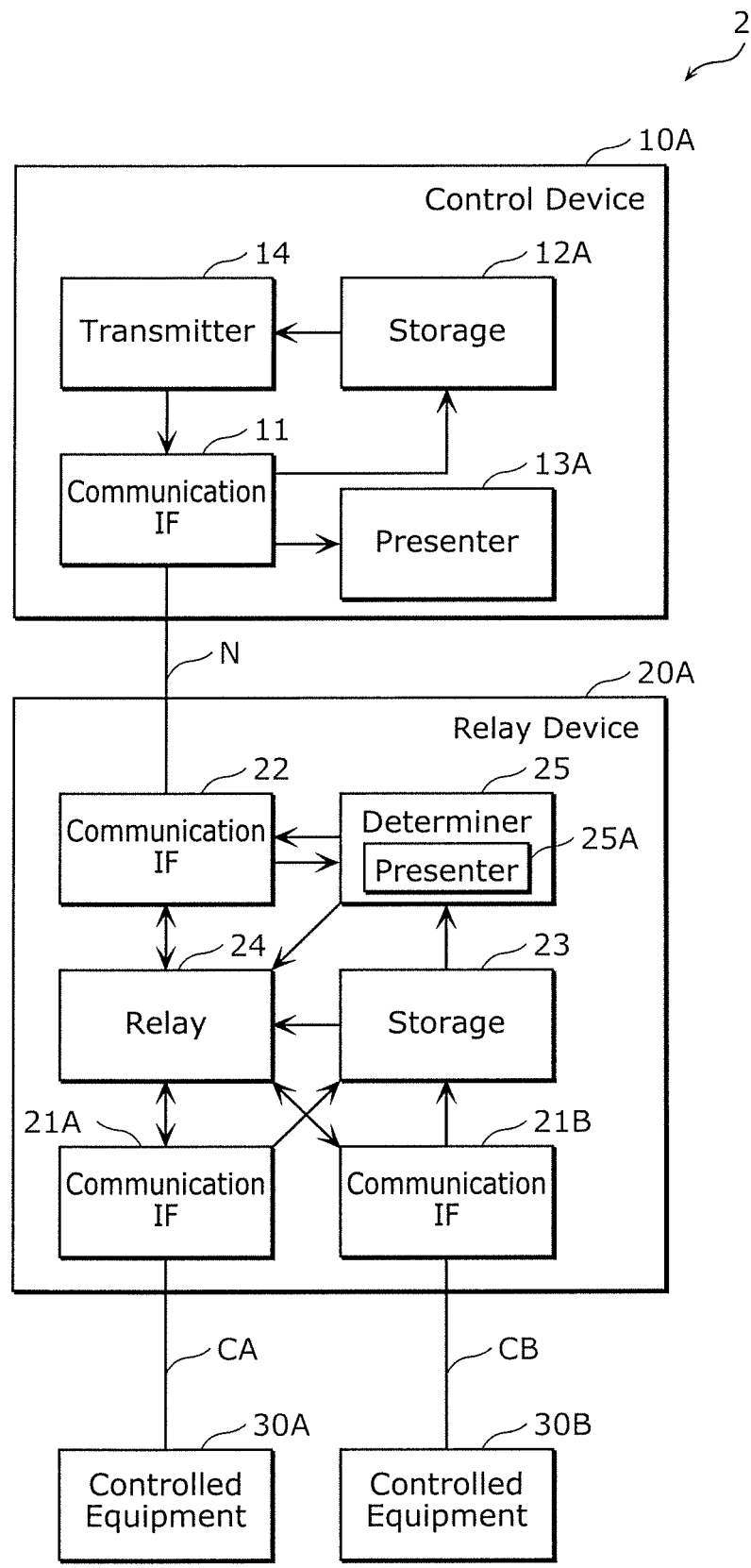
FIG. 7 is a block diagram showing a configuration of a communication system according to Example 2.

FIG. 7 is a block diagram showing a configuration of communication system 2 according to this example.

As shown in FIG. 7, communication system 2 includes control device 10A and relay device 20A. In addition, communication system 2 is connected to controlled equipment 30A and 30B.

Control device 10A and relay device 20A have the same functions as control device 10 and relay device 20 in Example 1, respectively. Unlike in Example 1, however, not control device 10A but relay device 20A performs the matching determination between the parameters. This difference will be mainly described below.

As shown in FIG. 7, control device 10A includes communication IF 11, storage 12A, presenter 13A, and transmitter 14. Control device 10A includes no determiner 13 of Example 1 unlike control device 10. In addition, the operation of storage 12A is different from that of storage 12 in Example 1.

Like storage 12 according to Example 1, storage 12A stores two sets of parameters used for communications through communication IFs 21A and 21B. Once the parameters are provided from storage 23 of relay device 20A via communication IF 11, storage 12A newly stores the provided parameters to update the stored parameters.

Relay device 20A includes communication IFs 21A, 21B, and 22, storage 23, relay 24, and determiner 25.

Relay device 20A includes determiner 25 unlike relay device 20 in Example 1.

Determiner 25 is a processor that determines whether the two sets of parameters stored in storage 12A match the two sets of parameters stored in storage 23. Determiner 25 obtains the two sets of parameters stored in storage 12A and determines whether the obtained parameters match the two sets of parameters stored in storage 23. This determination is also referred to as "matching determination". Determiner 25 obtains the two sets of parameters stored in storage 12A by obtaining the parameters contained in the control packets received from control device 10A.

If the determiner determines in the matching determination that the two sets of parameters stored in storage 12A match the two sets of parameters stored in storage 23, relay 24 relays the control packets received from control device 10A. That is, relay 24 receives control instructions and transmits the received instructions to the controlled equipment when the two sets of parameters stored in storage 12A match the two sets of parameters stored in storage 23.

Determiner 25 may include presenter 25A that presents information to the user. Presenter 25A is an LED indicator, for example. Presenter 25A presents an error to the user if it is determined in the matching determination that the two sets of parameters stored in storage 12A do not at least partially match the two sets of parameters stored in storage 23. For example, presenter 25A indicates the occurrence of an error with light emitted from the LED indicator. Presenter 25A may also be a display screen or a speaker like determiner 13 in Example 1.

An operation of communication system 2 configured as mentioned above will be described.

Figure 8:
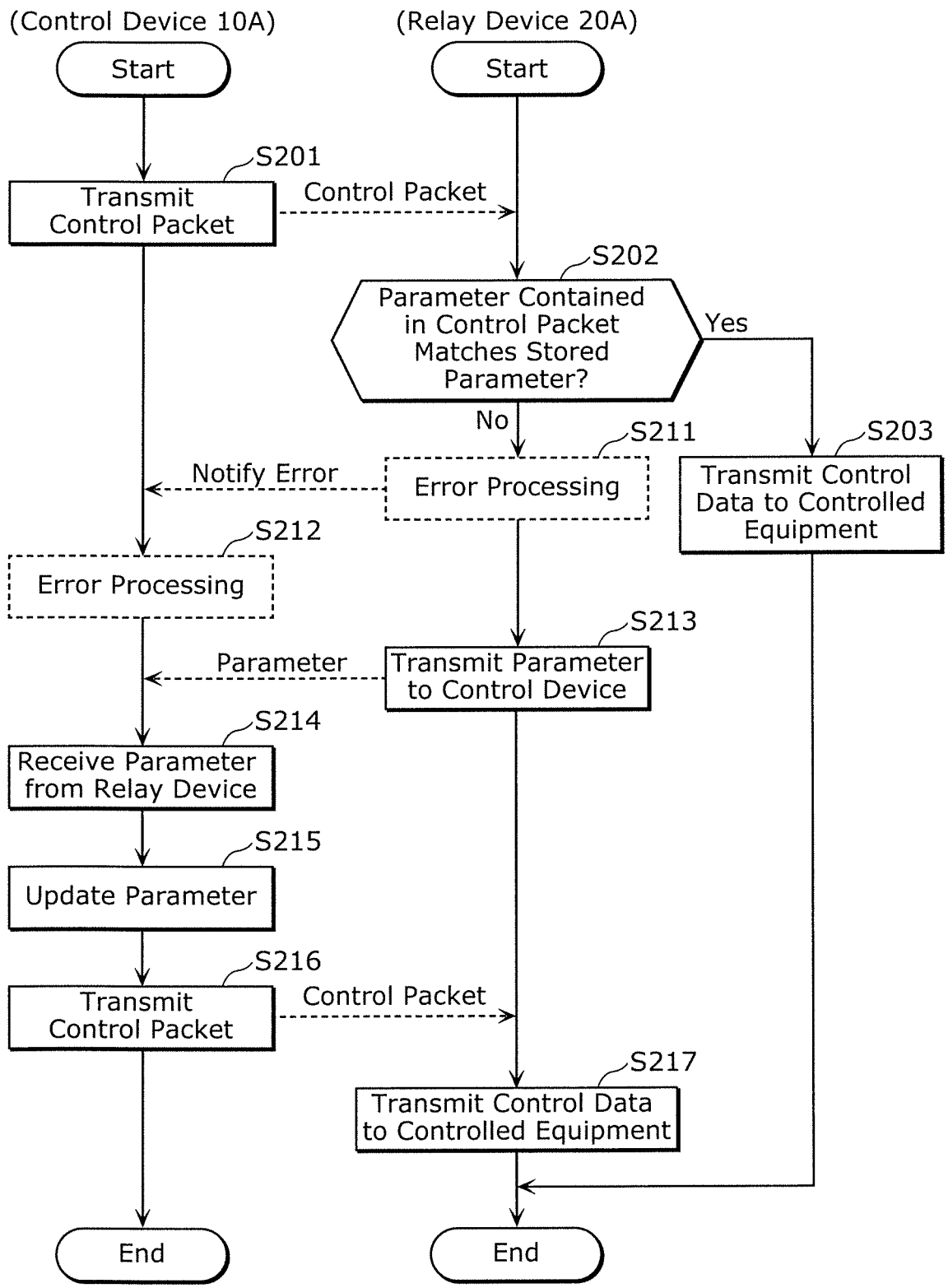
FIG. 8 shows a flow of processing performed by a control device according to Example 2.

FIG. 8 shows a flow of processing performed by communication system 2 according to this example.

In step S201, transmitter 14 generates control packets and transmits the generated packets. The generated control packets contain the two sets of parameters stored in storage 12A at present. These parameters do not necessarily match the two sets of parameters stored in storage 23.

In step S202, determiner 25 of relay device 20A receives the control packets transmitted by control device 10A in step S201. The determiner determines then whether the two sets of parameters obtained in the received control packets match the two sets of parameters stored in storage 23. If the determiner determines that the two sets of parameters match each other (Yes in step S202), the process proceeds to step S203. If not (No in step S202), the process proceeds to step S211.

In step S203, relay 24 of relay device 20A obtains the respective parameters set for communication IFs 21A and 21B from storage 23. The relay transmits then, to the controlled equipment, the control data contained in the control packets from one of communication IFs 21A and 21B for which the parameters that match the parameters contained in the control packets received in step S202 are set. With the end of step S203, the series of processing shown in FIG. 8 ends.

In step S211, determiner 25 performs error processing. In the error processing, for example, presenter 25A indicates the occurrence of an error with light emitted from the LED indicator to present the error to the user. This presentation of the error by presenter 25A encourages the user to take an appropriate action. Alternatively, determiner 25 may transmit error notification indicating the occurrence of an error to control device 10A. Step S211 may be omitted.

In step S212, presenter 13A performs error processing. In the error processing, for example, presenter 13A displays an image indicating the occurrence of an error on the display screen, indicates the occurrence of an error with light emitted from the LED indicator, or outputs a sound notifying the occurrence of an error from the speaker, to present the error to the user. This presentation of the error by presenter 13A encourages the user to take an appropriate action. Step S212 may be omitted.

In step S213, determiner 25 transmits the two sets of parameters stored in storage 23 to control device 10A.

In step S214, storage 12A receives the two sets of parameters transmitted in step S213.

In step S215, storage 12A newly stores the two sets of parameters received in step S214 to update the stored two sets of parameters.

In step S216, transmitter 14 of control device 10A generates a control packet containing the parameters updated in step S215 and transmits the generated packets to relay device 20A.

In step S217, relay device 20A receives the control packets transmitted in step S216. Relay 24 of relay device 20A obtains the respective parameters set for communication IFs 21A and 21B from storage 23. The relay transmits then, to the controlled equipment, the control data contained in the control packets from one of communication IFs 21A and 21B for which the parameters that match the parameters contained in the control packets received in step S217 are set. With the end of step S217, the series of processing shown in FIG. 8 ends.

In the series of processing, assume that the two sets of parameters stored in storage 12A match the two sets of parameters stored in storage 23. In this example, the two sets of parameters stored in storage 12A are not updated and the control data is transmitted through the relay by relay device 20A to controlled equipment 30A or 30B.

On the other hand, assume that the two sets of parameters stored in storage 12A differ from the two sets of parameters stored in storage 23. In this example, the two sets of parameters stored in storage 12A are updated and new control packets containing the updated parameters are transmitted. The control data containing the updated parameters is transmitted through the relay by relay device 20A to controlled equipment 30A or 30B.

As described above, the communication system according to this example causes the relay device to determine whether the two respective sets of parameters stored in the control device and the relay device match each other. Based on such a specific configuration, the communication system reduces problems in controlling the controlled equipment through the relay between network communications and serial communications.

If the two respective sets of parameters stored in the control device and the relay device do not match each other, the control device obtains the two sets of parameters from the relay device and stores the obtained parameters. This allows elimination of the mismatch between the parameters and transmission of the control data to the controlled equipment after the elimination.

If the two respective sets of parameters stored in the control device and the relay device do not match each other, the control device notifies the user of the mismatch. This allows presentation of the mismatch between the parameters to the user, and encourages the user to take an appropriate action.

Our communication systems have been described above based on the examples. This disclosure is not limited to these examples. This disclosure includes other examples such as those obtained by variously modifying the examples as conceived by those skilled in the art or those achieved by freely combining the constituent elements in the different examples without departing from the scope and spirit of the disclosure.

INDUSTRIAL APPLICABILITY

The concepts in this disclosure are applicable to a communication system that reduces problems in controlling controlled equipment through the relay between network communications and serial communications. More specifically, this disclosure is applicable to control systems, for example, that control industrial equipment.

The invention claimed is:

1. A method of controlling a communication system including a control device and a relay device connected via a network to control a plurality of controlled equipment, the relay device including:

a plurality of interfaces communicably connected to the plurality of controlled equipment in one to one correspondence; and a relay device storage that stores a plurality of first parameters each of which indicates a communication standard and a serial setting of serial communication and which are used for communication by the plurality of interfaces in one to one correspondence, the control device including:

a control device storage that stores a plurality of second parameters each of which indicates a communication standard and a serial setting of serial communication and which are defined for use for communication by the plurality of interfaces in one to one correspondence, and the method comprising:

(a) transmitting, by the control device, control data and one of the plurality of second parameters to the relay device;

(b) determining whether the one of the plurality of second parameters matches one of the plurality of first parameters; and (c) transmitting, by the relay device, the control data received from the control device in (a), using one of the plurality of interfaces of the relay device for which the one of the plurality of second parameters is set if it is determined in the determining that the one of the plurality of first parameters matches the one of the plurality of second parameters.

2. The method according to claim 1, wherein the relay device storage includes a switch whose state defines the one of the plurality of first parameters, the state being changeable by an operation by a user, and in (b), the determining is performed using the one of the plurality of first parameters defined by the state of the switch.

3. The method according to claim 1, wherein in (b), the control device obtains the one of the plurality of first parameters from the relay device, and performs the determining using the one of the plurality of first parameters obtained, in (a), the control device transmits the control data if it is determined in the determining in (b) that the one of the plurality of first parameters matches the one of the plurality of second parameters, and in (c), the relay device receives the control data transmitted in (a), and transmits the control data received.

4. The method according to claim 3, further comprising:
(d) storing, as a new second parameter in the control device storage by the control device, the one of the plurality of first parameters obtained from the relay device in (c) if it is determined in the determining that the one of the plurality of first parameters does not match the one of the plurality of second parameters, wherein the control device further transmits the control data containing the new second parameter to the relay device, and the relay device further transmits the control data containing the new second parameter received from the control device by one of the plurality of interfaces of the relay device for which the one of the plurality of first parameters is set.

5. The method according to claim 3, wherein, in (d), a presenter included in the control device presents an error to a user if it is determined in the determining that the one of the plurality of first parameters does not match the one of the plurality of second parameters.

6. The method according to claim 5, further comprising:
(d) receiving at least one of the plurality of first parameters from the relay device and storing the at least one of the plurality of first parameters as a new second parameter in the control device storage by the control device if it is determined in the determining that the one of the plurality of first parameters does not match the one of the plurality of second parameters;

(e) transmitting, by the control device, new control data containing the new second parameter to the relay device; and (f) transmitting, by the relay device, the new control data received from the control device in (e), using one of the plurality of interfaces of the relay device for which the one of the plurality of first parameters is set.

7. The method according to claim 6, wherein, in (g), a presenter included in at least one of the control device or the relay device presents an error to a user if it is determined in the determining that the one of the plurality of first parameters does not match the one of the plurality of second parameters.

8. The method according to claim 1, wherein in (b), the relay device performs the determining using the one of the plurality of second parameters contained in the control data transmitted in (a), and in (c), the relay device transmits the control data received from the control device in (a) if it is determined in the determining in (b) that the one of the plurality of first parameters matches the one of the plurality of second parameters.

9. The method according to claim 1, wherein the control device and the relay device are connected via a network under Ethernet for Control Automation Technology (ETHERCAT, registered trademark), and each of the plurality of interfaces and an associated one of the plurality of controlled equipment is connected via a serial communication cable.

10. A communication system comprising: a control device and a relay device including, and a processor connected via a network to control a plurality of controlled equipment, wherein the relay device includes:

a plurality of interfaces, each communicably connected to one of the plurality of controlled equipment in one to one correspondence; and a relay device storage that stores a plurality of first parameters each of which indicates a communication standard and a serial setting of serial communication and which are used for communication by the plurality of interfaces in one to one correspondence, the control device includes:

a control device storage that stores a plurality of second parameters each of which indicates a communication standard and a serial setting of serial communication and which are defined for use for communication by the plurality of interfaces in one to one correspondence; and a transmitter that transmits control data and one of the plurality of second parameters to the relay device, the processor determines whether the one of the plurality of second parameters matches one of the plurality of first parameters, and the relay device further includes a relay that transmits the control data received from the transmitter by one of the plurality of interfaces of the relay device for which the one of the plurality of second parameters is set if it is determined in the determining that the one of the plurality of first parameters matches the one of the plurality of second parameters.

11. A relay device connected to a control device via a network to control a plurality of controlled equipment, the relay device comprising:

a plurality of interfaces, each communicably connected to one of the plurality of controlled equipment in one to one correspondence; and a relay device storage that stores a plurality of first parameters each of which indicates a communication standard and a serial setting of serial communication and which are used for communication by the plurality of interfaces in one to one correspondence, wherein the control device includes:

a control device storage that stores a plurality of second parameters each of which indicates a communication standard and a serial setting of serial communication and which are defined for use for communication by the plurality of interfaces in one to one correspondence; and a transmitter that transmits control data and one of the plurality of second parameters to the relay device, the relay device further comprises a processor that determines whether the one of the plurality of second parameters matches one of the plurality of first parameters, and the relay device further comprises a relay that transmits the control data received from the transmitter by one of the plurality of interfaces of the relay device for which the one of the plurality of second parameters is set if it is determined in the determining that the one of the plurality of first parameters matches the one of the plurality of second parameters.

\* \* \* \* \*